A. SEUSS.
HEADLIGHT FOR VEHICLES.
APPLICATION FILED APR. 21, 1911.
1,010,965.
Patented Dec. 5, 1911.
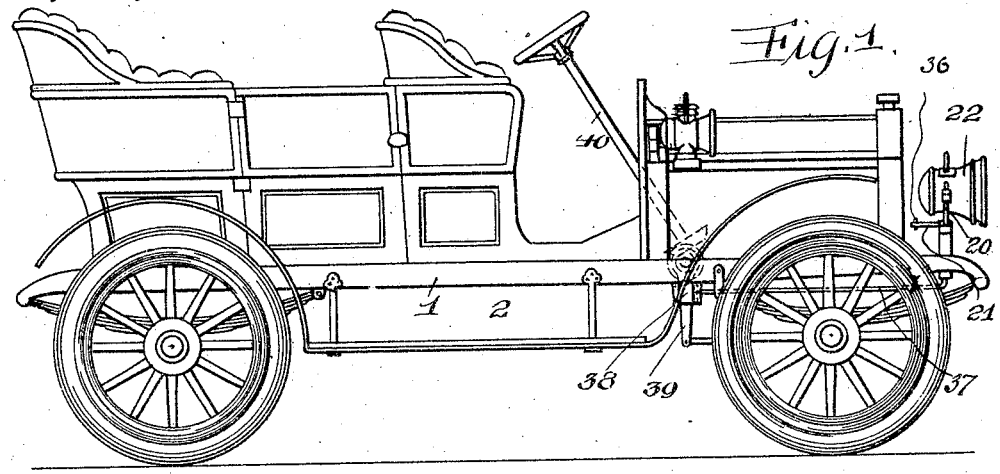
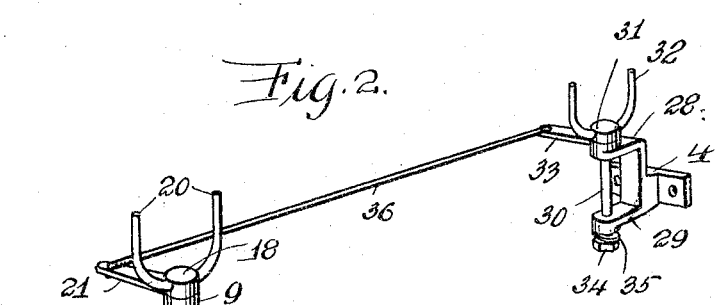
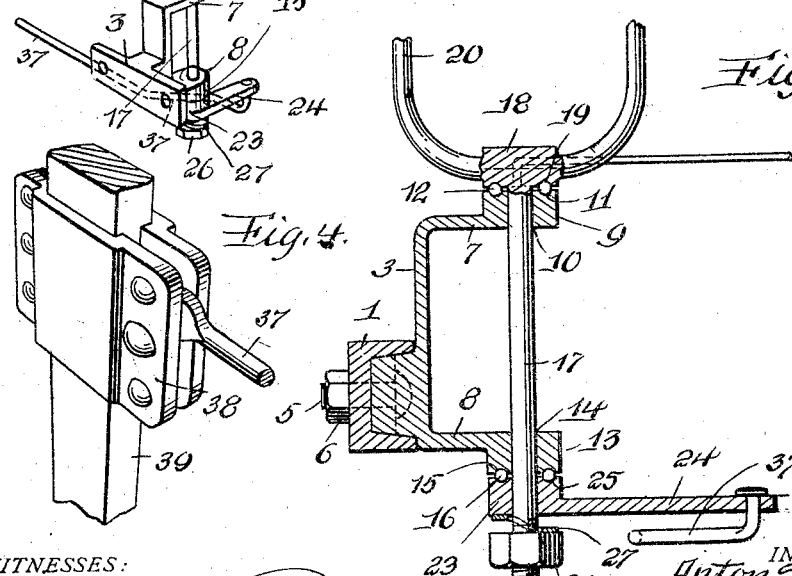
WITNESSES:
INVENTOR.
Anton Seuss.
BY
ATTORNEYS.

UNITED STATES PATENT OFFICE.

ANTON SEUSS, OF PITTSBURGH, PENNSYLVANIA.

HEADLIGHT FOR VEHICLES.

1,010,965.   Specification of Letters Patent.   Patented Dec. 5, 1911.

Application filed April 21, 1911. Serial No. 622,560.

*To all whom it may concern:*

Be it known that I, ANTON SEUSS, a citizen of the United States of America, residing at Pittsburgh, in the county of Allegheny and State of Pennsylvania, have invented certain new and useful Improvements in Headlights for Vehicles, of which the following is a specification, reference being had therein to the accompanying drawing.

This invention relates to headlights or lamps for vehicles, and more particularly to the lamps of an automobile.

The primary object of my invention is to provide novel means, in a manner as will be hereinafter set forth, whereby the lamps of the automobile will be shifted to at all times cast the rays of light in the path of the automobile.

A further object of this invention is to furnish an automobile with shiftable headlights that can be adjusted through the medium of the steering post of the automobile.

With the above and other objects in view, the invention resides in the novel construction, combination and arrangement of parts to be hereinafter specifically described and then claimed.

Reference will now be had to the drawing, wherein like numerals denote corresponding parts throughout the several views, in which:—

Figure 1 is a side elevation of an automobile provided with the adjustable lamps, Fig. 2 is a perspective view of the lamp holders, Fig. 3 is an enlarged vertical sectional view of one of the holders, and Fig. 4 is a perspective view of part of the steering post of the automobile.

The reference numeral 1 denotes the channel-shaped side frames of an automobile 2 and connected to the inner sides of said frames, at the forward ends thereof, are brackets 3 and 4. Bolts 5 and nuts 6 are preferably used as a fastening means. The bracket 3 has inwardly extending arms 7 and 8, the arm 7 having a boss 9 provided with a vertical opening 10 surrounded by a ball race 11 for antifriction balls 12. The arm 8 has a depending boss 13 provided with a vertical opening 14, surrounded upon the bottom side of the boss by a ball race 15 for anti-friction balls 16.

Rotatably mounted in the openings 14 and 10 of the arms 8 and 7 respectively is a vertical pin 17 having the upper end thereof provided with a head 18, said head having the under side thereof provided with a race 19 to receive the anti-friction balls 12. The head 18 supports vertical diametrically opposed arms 20 and a rearwardly extending horizontal crank 21. The arms 20 are adapted to support a conventional form of lamp 22.

Mounted upon the lower end of the pin 17 is the boss 23 of a crank 24, said boss having an annular race 25 for the anti-friction balls 16. The lower end of the pin 17 is provided with a nut 26 and interposed between said nut and the boss 23 is a split resilient washer 27 of the "Verona" type serving functionally as a nut lock.

The bracket 4 has inwardly extending arms 28 and 29 supporting a revoluble pin 30 having a head 31 provided with lamp arms 32 and a rearwardly extending crank 33. The pin 30 is retained in the arms 28 and 29 by a nut 34 and a locking washer 35. The elements 28 to 35 inclusive are similar to the same elements of the bracket 3 with the exception that the ball race is eliminated in connection with the arm 29. The rearwardly extending cranks 21 and 33 are connected by a rod 36. Connected to the outer end of the crank 24 is a reach-rod 37 and the opposite end of said rod is pivotally connected to a strap 38 mounted upon the steering crank 39 of the steering post 40, the steering crank 39 and the post 40 being of the ordinary and well known type used in connection with automobiles.

It is obvious that from the mechanism just described that the lamps 22 will be shifted in the same direction as the wheels of the automobile, consequently the rays of light will be always cast in the path of the automobile.

It is apparent from the foregoing that the lamp shifting mechanism is applicable to various types of automobiles, and while in the drawings there is illustrated a preferred embodiment of the invention, it is to be understood that the structural elements thereof are susceptible to such changes as fall within the scope of the appended claim.

What I claim is:—

In a lamp shifting mechanism for automobiles, brackets positioned upon the inner sides of the frame of the vehicle and each consisting of inwardly projecting arms provided with vertically alining perforations, a boss upon the outer face of the upper of said arms and provided with a ball race, a pin revolubly supported by said arms and extending through said perforations, a head upon said pin, said head provided with a ball race opposing the ball race in the boss carried by the upper of said arms, antifriction members interposed between the head and the boss in said races, lamp supporting arms carried by the said head, and means for shifting in unison the pins carried by the arms of said brackets.

In testimony whereof I affix my signature in the presence of two witnesses.

ANTON SEUSS.

Witnesses:
MAX H. SROLOVITZ,
CHRISTINA T. HOOD.